US008685476B2

(12) United States Patent  (10) Patent No.: US 8,685,476 B2
Folkman  (45) Date of Patent: Apr. 1, 2014

(54) POLYSILOXANE (SILICONE) TREATMENT COMPOSITION FOR SUPPRESSION OF MOLD AND SPOILAGE ON ANIMAL FEED AND FORAGE, AND METHODS OF USING SAME

(76) Inventor: Mark L. Folkman, Twin Falls, ID (US)

(*) Notice: Subject to any disclaimer, the term of this patent is extended or adjusted under 35 U.S.C. 154(b) by 627 days.

(21) Appl. No.: 12/790,656

(22) Filed: May 28, 2010

(65) Prior Publication Data

US 2011/0135788 A1 Jun. 9, 2011

Related U.S. Application Data

(63) Continuation-in-part of application No. 12/383,076, filed on Mar. 19, 2009, now abandoned.

(60) Provisional application No. 61/349,190, filed on May 27, 2010.

(51) Int. Cl.
*A23L 1/28* (2006.01)
*A23L 1/36* (2006.01)
*A23B 7/16* (2006.01)
*A01N 63/00* (2006.01)
*A61K 35/00* (2006.01)
*A01N 37/18* (2006.01)

(52) U.S. Cl.
USPC ............ 426/61; 426/93; 426/310; 424/93.45; 424/115; 514/3.3

(58) Field of Classification Search
USPC .......... 426/635, 61, 93, 310; 424/93.1, 93.45, 424/115; 514/3.3
See application file for complete search history.

(56) References Cited

U.S. PATENT DOCUMENTS

| 3,184,314 | A |   | 5/1965  | Forest et al.         |
|-----------|---|---|---------|-----------------------|
| 3,284,212 | A |   | 11/1966 | Tribble et al.        |
| 4,015,366 | A | * | 4/1977  | Hall, III ........ 47/1.43 |
| 4,508,737 | A |   | 4/1985  | Forest et al.         |
| 4,556,505 | A |   | 12/1985 | Fenn                  |
| 4,592,915 | A |   | 6/1986  | Goyette et al.        |
| 4,813,154 | A |   | 3/1989  | Ronning               |
| 5,413,867 | A |   | 5/1995  | Chang et al.          |

(Continued)

FOREIGN PATENT DOCUMENTS

EP 0091092 10/1983
WO WO2011014295 2/2011

OTHER PUBLICATIONS

PCT International Search Report and the Written Opinion, PCT/US2010/036745, Jan. 17, 2011, Applicant: Folkman.

(Continued)

*Primary Examiner* — Humera Sheikh
*Assistant Examiner* — Bhaskar Mukhopadhyay
(74) *Attorney, Agent, or Firm* — Pedersen and Company, PLLC; Ken J. Pedersen; Barbara S. Pedersen (57) ABSTRACT

Polydimethylsiloxane and/or siloxane (silicone)-derived chemical compounds are used to coating harvested forages to protect against rain and/or other weather damage and to suppress mold and spoilage in harvested forages. The PDMS compound and derivatives thereof are also found to suppress the damage resulting from oxidation within the feedstuff mass. When applied, PDMS coats the feedstuff and is included in the moisture portion of the feed or forage mass. This helps preserve the feed quality and slows the damaging effects of spoilage organisms and oxidation.

12 Claims, 6 Drawing Sheets

(56) References Cited

U.S. PATENT DOCUMENTS

| | | |
|---|---|---|
| 5,888,501 A | 3/1999 | Backman et al. |
| 6,326,037 B1 | 12/2001 | Mann et al. |
| 6,610,341 B2 | 8/2003 | Vinelli |
| 6,719,988 B2 | 4/2004 | Prusiner et al. |
| 2003/0152689 A1* | 8/2003 | Ethington et al. ............ 426/635 |
| 2007/0265166 A1 | 11/2007 | Bardella et al. |
| 2007/0275101 A1 | 11/2007 | Lu et al. |
| 2010/0239718 A1 | 9/2010 | Folkman |

OTHER PUBLICATIONS

Polydimethylsiloxane, article cited in applicant's related U.S. Appl. No. 12/383,076.

* cited by examiner

POLYSILOXANE (SILICONE) TREATMENT COMPOSITION FOR SUPPRESSION OF MOLD AND SPOILAGE ON ANIMAL FEED AND FORAGE, AND METHODS OF USING SAME

This application is a continuation-in-part of U.S. Non-Provisional application Ser. No. 12/383,076, filed Mar. 19, 2009, and this application claims benefit of Provisional Application 61/349,190, filed May 27, 2010, the entire disclosures of which are incorporated herein by this reference.

BACKGROUND OF THE INVENTION

1. Field of the Invention

The present invention relates to the use of treatment compositions for improving animal feed and forage, and especially for reducing many of the typical negative effects of long term storage on feed and forage.

The present invention relates, more specifically, to the use of polydimethylsiloxane (PDMS) and other polysiloxane (silicone) derived chemical compounds, in the suppression of mold, heating and spoilage in feed and forage products normally used to feed animals preferably cattle.

2. Background of the Invention

Feedstuff commodity and forage products have been used for years as a food source and/or feed supplement for animals. Each product has been subject to spoilage through mold, heating and overall degradation. Several techniques and processes have been used in the past to slow or minimize the amount of loss typically found in forage and feedstuff products. Spoiled, heat damaged, or moldy feed can cause animals to become sick, lose weight, and/or drop in production in the case of commercial agricultural operations. Reducing spoilage improves animal health and economic return.

Large animal operations are one of the major uses of feedstuff and forage products. Typically these feeds are mixed with other ingredients to make a complete ration. Spoiled feed is particularly damaging to these large operations causing animals, typically cattle, to get sick. Spoilage is a major economic loss to large animal operations worldwide.

Rain and the effects of weather tend to increase spoilage of many forage products, for example, hay, grass, and other crops that, due to current harvesting practices, remain exposed to rain and weather for some time after harvesting. Weather-damaged feed can result in loss of forage nutrient value resulting in economic loss and reduced value as an animal feed. Therefore, rain and/or weather can increase spoilage in the forage mass and reduce animal performance.

Forages compromised by rain and/or weather are particularly damaging to large dairy operations, causing animals, typically cattle, to experience less feed uptake and even compromised health. While forages are mixed with other ingredients to make a complete ration for many dairy animals, spoilage from rain/weather, and hence reduced quality, of the forage component, can cause a major economic loss to large animal operations worldwide.

Another problem associated with loss in forage and feedstuff products are the hazards associated with damage to the feed product and facilities used to store these feed products. Oxidative or microbial heating in the feed or forage mass can lead to self-ignition, resulting in severe damage to surrounding buildings and assets. Forages and Feedstuffs coated with PDMS as been found to reduce oxidative and/or microbial heating.

Care and protection of feedstuff and forage investments, therefore, is a major subject of concern for many animal feed operations. The present invention meets many needs for protecting and preserving forage for animal feed.

SUMMARY OF THE INVENTION

Polydimethylsiloxane ("PDMS") and/or other polymerized siloxane compounds, including derivatives, are added to feedstuff and forage products, to reduce heating, oxidation, mold growth, and spoilage. PDMS and/or other polymerized siloxane compounds work by direct application to the feed/forage product, coating the surface of the feed/forage mass to reduce spoilage and also, through inclusion, entering into the moisture portion of the feedstuff to do the same.

Polydimethylsiloxane (PDMS) is derived from siloxane compound chemistry with a number of potential derivatives. When applied to the feedstuff and forage products preferably at the time of cutting or soon thereafter, PDMS has been found to coat the surface of the forage mass protecting the forages from the spoiling effects of weather, and/or from other spoilage during storage. Thus, the PDMS treatment protects the harvested food/forage during periods it is exposed to rain and weather, and also reduces heating, oxidation, mold growth, and spoilage once the food/forage is harvested and stored.

PDMS works by direct application to the feed product, coating the surface of the feed mass with a thin coat of PDMS, wherein the thin coat which adheres to the stems, small stems, and leaves of the food/forage to protect the harvested and/or stored plant.

DETAILED DESCRIPTION OF THE PREFERRED EMBODIMENTS

Polydimethylsiloxane (PDMS) is derived from siloxane compound chemistry with a number of potential derivatives.

The formula for PDMS is as follows: R3-SiO[Si(CH3)2O]nSi—R3, where R represents any organic or inorganic functional group. Preferably, (H3C)3SiO[Si(CH3)2O]nSi(CH3)3 is used, where n is the number of repeating monomer units making up the siloxane polymer molecule. Lower values of n, for example, are expected to produce more effective results but benefit is also achieved using higher values of n. Because polydimethylsiloxane (PDMS) is a polymer, a number of other chemical functional groups can be added as derivatives to the PDMS molecule but the key ingredient is the dimethylsiloxane monomer. One may note that herein, and as know in the chemical arts, the term "silicone" is a traditional term for polymerized siloxane monomers.

Polydimethylsiloxane works by direct application to the feedstuff or forage product, allowing the silicone polymer compound to coat the surface of the product mass. The PDMS can be applied with water and/or a variety of carriers to assure optimum coverage.

Once applied to the feedstuff or forage mass, the PDMS compound reduces the effects of oxygen utilization at the surface of the feed product and in the moisture of the product mass. When applied to the surface of the harvested crop at the time or about the time of cutting, the PDMS acts as a chemical barrier to rain and other effects of weather. For example, it is preferred that the PDMS is applied at the time of cutting, but in some embodiments, the PDMS may be applied within a short time before cutting or after cutting. While the PMDS may be applied as early as 5 days before cutting and at late as 14 days after cutting (for example, after a 14 day hay-drying period in the field, and at the time of baling the dried hay) and still exhibit some benefit, it is preferred that the PMDS be applied from 3 days before to 7 days after cutting, more preferably from 1 day before to 1 day after cutting, and most preferably at the time of cutting. "At the time of cutting" means herein within 1 hour or less prior to or after cutting, for example, within 2 minutes before or after cutting by spraying the treatment composition from the cutting equipment, from baling equipment immediately following the cutting equipment (see baleage, for example), and/or from a vehicle transporting or powering the cutting or baling equipment. Once the feedstuff or forage is stored, the PDMS continues to suppress mold growth, for example, as further described below.

One of the modes by which PDMS suppresses mold growth throughout the forage mass is by making it more difficult for mold to acquire nutrients and oxygen. Further, PDMS suppresses heating in the forage mass by reducing the effect of available oxygen and hence the ability of the forage to oxidize during storage.

Silicone compounds including polydimethylsiloxane (PDMS) also have been found (though to a lesser degree) to reduce the surface tension in the forage commodity. Reducing the surface tension in given forages allows for available moisture to be more evenly-distributed throughout the forage mass reducing high moisture "slugs" and allowing feed and forage products to be preserved tighter with less enclosed oxygen. PDMS can also be used to improve the harvestability of forage commodities in harvest equipment. The reduction of surface tension in the forage mass can also allow forage harvesting equipment to prepare a more consistent forage product.

Polydimethylsiloxane (PDMS) is unique and beneficial as an additive to feed/forages, especially at or about the time of harvesting or for storage of the feed/forages. It is believed that some benefit is realized when the preferred polydimethylsiloxane treatment composition is applied at the time of cutting or within 3 day or less before or after cutting, in amounts ranging from about 5-40000 ppm on the forage, wherein this calculation and others in this document referred to as "dry matter basis" are done based on the forage being dried to a very low or no moisture content, that is, <1 wt % moisture content. This, in effect, removes the variable of moisture content of the forage, which can vary over a wide range in the field, in storage, or in other environments wherein the forage has not been purposefully dried. Those in this field of feed and forage art will understand how to calculate ppb (weight parts per billion), ppm (weight parts per million), and wt-% of a component being applied to a normally wet and/or high-moisture forage or feed, on a dry matter basis.

Amounts at the lower end of this range are expected to be marginal when and amounts at the upper end of this range are expected to be effective but not economical. Preferably, PDMS is applied to forage in amounts ranging from 18-300 ppm (dry matter basis), and more preferably in amounts ranging from 20-70 ppm on the forage (dry matter basis), and most preferably 30-50 ppm on the forage (dry matter basis). The inventor believes that reasons for this may include:

1. PDMS is weakly ionic. This allows the molecule to attach to organic substances such as the wax on alfalfa and grass leaves. Unlike silicates and siliconates, PDMS is not water soluble and will not wash off under the force of rain or heavy dew.
2. PDMS will not get bound by other ionic compounds such as metals ions found in mix water and rain.
3. The problem with chemical attachment to forages is the fact that the surface of forage plants are not only waxy but also carry a negative charge making it difficult for an ionic compound such as siliconates or silicates to maintain a bond.
4. PDMS has the unusual property of being permeable to oxygen, nitrogen, and water vapor allowing the forage plant to continue to dry down under normal environmental conditions while protecting the forage surface from incoming rain or moisture.

Preferred embodiments of the composition suppress mold, heating, and spoilage in feed and forage products by coating the feed/forage with polydimethylsiloxane of the formula R3-SiO[Si(CH3)2O]nSi—R3 where R is any organic or inorganic functional group. The polydimethylsiloxane may contain any siloxane chemical derivative of the formula R3-SiO[Si(CH3)2O]nSi—R3 where the value n is any number of repeating monomer units, for example 10-500, preferably 50-300, and more preferably 175-200, with 182 being the current optimum. The inventor has found that PDMS with n equal to approximately 182 is effective, but expects a wide range of n to be effective. Viscosity of silicone of 300 to over 1000 centistokes has been approved by the FDA for food grade additive, and the inventor expects that PDMS with viscosity of this range, and lower viscosity, will be effective.

The preferred embodiments are sprayed or otherwise applied to feed/forage such as alfalfa hay, alfalfa silage, grass hay, grass silage, grain hay, grain silage, corn silage, corn (such as rolled, flaked, cracked or processed), or other food sources for dairy, livestock, or other animal operations. The grain hay and/or grain silage may be, for example, barley, wheat, oats, rye, triticale, or other cereal grain or silage. The PDMS may be mixed with live bacterial products, enzyme products, and/or organic or mineral acid products to further enhance fermentation and/or preservation in the feed mass.

Preferred embodiments include applying the PDMS composition to the forage mass during cutting, so that the PDMS coats the large stems and/or small stems, and leaves of the forage mass. Thus-applied, the PDMS composition acts as a chemical barrier against rain and a variety of other weathering effects. During exposure to rain/weather and during later storage, the PDMS composition reduces mold, improves color retention, reduces leaf shatter (loss), reduces aerobic microbial heating in stored forages, and reduces oxidation in stored forages.

Preferred embodiments comprise application by spraying or other processes of a liquid containing silicone onto a feed/forage crop at, before, or after cutting of the crop, for example, preferably at the time of swathing, baling, or storing the feed/forage. Hereafter, the terms "crop" and "forage" will be used, and includes many different crops for use as animal feed. The preferred liquid containing PDMS should be applied no more than 5 days prior and no later than 14 days after cutting of the crop, more preferably within one day before or after cutting, and most preferably at the time of cutting the crop.

PDMS has been used in the past as a wetting/spreader agent for pesticides or insecticides on forage plants, well in advance of cutting of the forage, for example, at least 15-30 days before cutting the forage and more typically 2-6 months before cutting. Said use as a wetting/spreader agent typically involves application of silicone in an amount less than 18 ppm on the forage less than 4 ppm on a dry matter basis. PDMS has also been used as an antifoam additive in silage products, in extremely low amounts, that is, ppb of PDMS on the silage, for example, 0.5-2 ppb on a dry matter basis.

On the other hand, PDMS in the preferred embodiments of this invention is applied in higher amounts/concentrations and/or much nearer the time of harvest of the forage. In most embodiments, within a time period extending from 3 days before to 7 days after cutting of the forage, the application rate/amount of PDMS may be 18-300 ppm PDMS on the forage on a dry matter basis, and more preferably 20-70 ppm PDMS on the forage on a dry matter basis, and most preferably 30-50 ppm PDMS on the forage on a dry matter basis. Thus, the PDMS of the preferred embodiments of the invention is applied substantially later than said spreading/wetting agents for pesticides or herbicides, and substantially before additive of anti-foaming agents in silage products. Also, the amounts of PDMS applied in the preferably embodiments will preferably be greater than the amounts used as a pesticide/herbicide spreading/wetting agent and as an anti-foaming agent.

The inventor notes that sodium silicate or sodium metasilicate pentahydrate have been used in the animal feed industry. Also, sodium methyl siliconate has been used as a water soluble silicate compound for use on hay as an addition to carbonates, in particular potassium carbonate, to attempt to achieve quicker dry down of harvested hay in the windrow; the inventor has found such attempts at quicker dry-down using silicates, to be mostly ineffective. Also, the inventor believes that silicones are more effective than silicates and siliconates on animal feed/forage for the additional following reasons:

1. PDMS is weakly ionic. This allows the molecule to attach to organic substances such as the wax on alfalfa and grass leaves. Unlike silicates and siliconates, PDMS is not water soluble and will not wash off under the force of rain or heavy dew.

PDMS will not get bound by other ionic compounds such as metals ions found in mix water and rain.

2. The problem with chemical attachment to forages is the fact that the surface of forage plants are not only waxy but also carry a negative charge making it difficult for an ionic compound such as siliconates or silicates to maintain a bond.

3. PDMS as the unusual property of being permeable to oxygen, nitrogen, and water vapor allowing the forage plant to continue to dry down under normal environmental conditions while protecting the forage surface from incoming rain or moisture.

Preferred Embodiments for Applications at or near the time of cutting are shown in the table below. The ppm numbers in this table are on a dry matter basis, which is described above in this document.

| Crop | Optimal Dose | Maximum Dose | LV % of PDMS in Mixed Composition being applied to forage |
|---|---|---|---|
| Hay (Swather and Baler) (See A and B below) | 1-2 oz of PDMS (32.8-65.6 ppm) PDMS applied to forage) | 12 oz of PDMS (395 ppm PDMS applied to forage) | 8.3-16.7% PDMS |
| Baleage (See C below) | 0.525-1 oz of PDMS (17.2-32.8 ppm of PDMS applied to forage) | 12 oz of PDMS (395 ppm PDMS applied to forage) | 8.75-16.7% |
| Silage (See D below) | 0.525-1 oz of 100% PDMS (17.2-32.8 ppm of PDMS applied to forage) | 10 oz of PDMS (328 ppm PDMS applied to forage) | 8.75-16.7% |

Note that the above doses of PDMS are in terms of 100% PDMS that may be supplied, for example, as part of a PDMS solution called "30% PDMS". The preferred "30% PDMS" solution consists of 67 LV % water plus emulsifiers, 3 LV % Silicone Dioxide, and 30 LV % PDMS, and may be obtained from Trans-Chemco, of Bristol, WI, USA.

Examples of Specific Preferred Recipes, for Embodiments A-D (Above)

A. Swather-Applied Base Formula on Forage, which is, for example, alfalfa hay, grass hay, or grain hay such as barley, wheat, oats, rye, triticale, or other cereal grain hay, typically on the order of 80 weight-% moisture level (water content at the time of swathing or windrowing). This composition is applied on forage at time of swathing or windrowing (preferably by spray applied from the swather or windrower equipment so that it is applied within about 1 minute of swathing or windrowing). One will note that the table below describes actual amounts of the compounds being mixed together to form the treatment composition, and the notes below the table describe how many ounces of the treatment composition are applied per ton of forage in the field, that is, with the forage at whatever moisture content it exists in the field at the time of the application (not adjusting to a dry weight).

| Compound | Actual Amount | LV % of Base Formula |
|---|---|---|
| 30% PDMS (see definition of this PDMS solution above in this document) | 6 oz | 50% |
| Liquid Fermentation Product (*Lactobacillus Acidophilus* Fermentation Carrier) | 5.5 oz | 45.8% |
| Cobalt Carbonate | .0047 lbs | 0.58% by weight*** (***making up approximately the other 0.1 LV % to result in 100 LV % of Based Formula) |
| Phosphoric Acid | 0.5 oz | 4.1% |

Use: Apply 9 oz of above base formula per ton of forage in the field in low humidity areas (<40% average daily humidity)
Use: Apply 12 oz of base formula per ton of forage in the field in high humidity areas (>40% average daily humidity)

B. Baler-Applied Base Formula on Forage, wherein the forage is, for example, alfalfa hay, grass hay, or grain hay such as barley, wheat, oats, rye, triticale, or other cereal grain hay, typically on the order of 8-45% moisture level (water content), with 12-15% moisture level preferred. Composition is applied on forage at time of baling, preferably by spray applied from the baling equipment so that it is applied within about 1 minute of baling Again, the notes below the table describe how many ounces of the treatment composition are applied per ton of forage in the field (not adjusting to a dry weight).

| Compound | Actual Amount | LV % of Base Formula |
|---|---|---|
| 30% PDMS | 5 oz | 41.6% |
| Liquid Fermentation Product (*Lactobacillus Acidophilus* Fermentation Carrier) | 6.5 oz | 54.2% |
| Cobalt Carbonate | .0047 lbs | 0.58% by weight*** |
| Phosphoric Acid | 0.5 oz | 4.1% |

Use: Apply 10 oz of base formula per ton of forage in the field when baling moisture is less than 22%
Use: Apply 12 oz of base formula per ton of forage in the field when baling moisture is more than 22%

C. Baler-Applied Base Formula per ton of Baleage, wherein the baleage may be, for example, alfalfa hay, grass hay, or grain hay such as barley, wheat, oats, rye, triticale, or other cereal grain hay. Baleage is a cross between dry hay and silage. This translates into normal hay cut and laid into a windrow then baled into small wet bales typically at around 40-85% moisture, and preferably 50-65% moisture content. This technique is getting more attention due to new equipment and methods recently developed in the industry. Therefore, this Baler-Applied Base Formula for Baleage is applied directly to alfalfa and grass hay, for example, at the baler for those forages classified as baleage.

| Compound | Actual Amount | LV % |
|---|---|---|
| 30% PDMS | 2 oz | 33% |
| Liquid Fermentation Product (*Lactobacillus Acidophilus* Fermentation Carrier) | 3.75 oz | 62.5% |
| Cobalt Carbonate | .0023 lbs | 0.58% by weight*** |
| Phosphoric Acid | 0.25 oz | 4.1% |

Use: Apply 6 oz of base formula per ton of forage in the field.

D. Silage Applied Base Formula per ton of Silage (preferably applied directly, that is, without a water carrier stream, as the forage is chopped). The silage may be, for example, alfalfa hay, grass hay, or grain hay such as barley, wheat, oats, rye, triticale, or other cereal grain hay, which is typically at a 40-85% moisture level, and more preferably 60-72% moisture level (water content).

| Compound | Actual Amount | LV % |
|---|---|---|
| 30% PDMS | 1.75 oz | 29.1% |
| Liquid Fermentation Product (*Lactobacillus Acidophilus* Fermentation Carrier) | 4.0 oz | 66.7% |
| Cobalt Carbonate | .0023 lbs | 0.58% by weight*** |
| Phosphoric Acid | 0.25 oz | 4.1% |

Use: Apply 6 oz of base formula per ton of forage being chopped.

PDMS is believed to be the main active ingredient in the preferred composition, but the inventor has found that the inclusion of LFP, cobalt carbonate, and phosphoric acid is important for the effectiveness of the PDMS application to forage and the long-term effectiveness of the composition over the months that the forage is stored. The inventor has found that the Liquid Fermentation Product (LFP) is a very effective carrier for PDMS into and through the application equipment. Ethanol, sorbitol, and water have been tried, but all create/allow too much separation of the components, making the liquid unstable over time. The cobalt carbonate and the phosphoric acid are believed to work mainly or entirely as preservatives for the LFP.

The LFP described above is a liquid lactobacillus acidophilus fermentation product, which contains natural protein compounds that are natural emulsifier, particularly lactic acid and/or casein. The preferred LFP comprises culturing lactobacillus acidophilus bacteria in liquid comprising milk product(s), and phosphate(s), with pH control accomplished with aqua ammonia. The resulting LFP contains casein and lactic acid, which are believed to be effective emulsifiers for handling and spraying the PDMS-containing treatment composition. One, but not the only, recipe may be as follows:

LA (lactobacillus acidophilus) bacteria are added from cultures acquired from the ATCC (American Type Culture Collection) ATCC number 11975. The LA may be cultured for several days, for example, in 1000 gallons of water, 200-400 pounds of whey, and 1000-2000 grams diammonium phosphate, or other nutrient liquids as will be understood by those of skill in bacteria culturing. Aqua ammonia (26% ammonia in water) may be added throughout the fermentation for pH control. The fermentation product LFP is then able to be used as an emulsifier.

Alternative products to the LFP include sorbitol, ethanol, *Saccharomyces cerevisiae* (yeast) extract), and Yucca. Also emulsifiers such as xanthan gum, Polysorbate 80, and others.

Other carriers for the PDMS, in addition to, or in place of the LPF, could include various emulsifiers, for example, agar gum. Because the LFP carrier is organic, 75% phosphoric acid is added to drop the pH below 2.0 for preservation and improved storage. The range for this ingredient is preferably 3.5 to 4.5%. Phosphoric acid may be obtained from Univar or Brenntag West, for example. Alternatives to phosphoric acid could be acetic acid, lactic acid, propionic acid, and sulfuric acid, for example.

Various silicone mixtures that will provide the preferred amount of PDMS are available commercially. Trans-Chemco, Inc. "TRANS-30" is the preferred food-grade silicone source, which contains approximately 60-70% water plus emulsifiers, up to about 3 LV % silicone dioxide, and 27-33 LV % PDMS, totaling 100 LV. The emulsifiers are believed to account for approximately 10 LV % of the food-grade silicone mixture, and may include, for example, conventionally-known emulsifiers such as fatty acid esters.

A number of alternate PDMS sources may be used. For example, the silicone dioxide and emulsifiers of the Trans-Chemco 30% PMDS are not believed to be necessary and 100% PDMS could be used instead. Also, at the time of filing this document, the preferred R group for the polysiloxane compound is simply the CH3 methyl-group, but other R groups may be found to be effective.

Enzyme products may be added to the base formula, for example, in amounts ranging from 5% to 75%. For example, there are various Lactobacillus Acidophilus extracts, aspergillus oryzae extracts, amylase, and cellulose enzymes available in the marketplace.

The cobalt carbonate added to the preferred compositions is in powder form, and is available from various suppliers, such as ADM or Western Stockman's. As possible replacements of the cobalt carbonate, other mineral carbonates could be used, such as zinc carbonate, potassium carbonate, sodium carbonate but we have more experience and trust in cobalt. The range of addition preferably ranges from 0.5 to 0.6%. The mineral carbonates help keep oxygen from degrading the LFP.

Components that are not desirable and/or not needed in the composition for application to forage are: waxes, silicates including methyl silicates, siliconates, and other ionic chemicals. In many embodiments, it is desired that pesticides and herbicides not be included or should be less than 5 ppm.

The preferred method of preparing the PDMS mix/spray is:
LFP is added to a tank;
Cobalt carbonate is added to the LFP;
The 30% PDMS liquid is the added and mixed for 10 minutes;
Phosphoric acid 75% is added and mixed for an additional 10 minutes;
Resulting in the PDMS mixture for application to forage, by using conventional spraying mechanisms installed on conventional cutting, swathing, windrowing, and/or baling equipment and/or on the vehicle powering said equipment.

This mixture is applied to the forage mass by injecting the mixture product in line with water directly ahead of the spray nozzles. Adequate water is applied to assure good spray pattern and application typically 48-128 oz of water per ton of forage. When the mixture is to be applied to silage, the mixture is not mixed with water but rather applied directly without water as the forage is chopped.

EXPERIMENTAL EXAMPLES

Example #1

Water Repellency when Applied at the Windrower

Test Objective: To determine the effects of PDMS on swathed alfalfa hay with and without the application of water.

Test Procedure: A single field of alfalfa hay ($2^{nd}$ cutting) was swathed. One part of the field was selected for the application of 5 oz of the preferred PDMS solution in 6.5 oz of bacterial carrier of the formula:

PDMS: 5 oz of 30% PDMS (see composition of this preferred PDMS solution, that is, "30% PDMS", explained above in this document)
Lactobacillus Acidophilus Fermentation Carrier: 6.5 oz Phosphoric Acid Preservative: 0.5 oz Cobalt Carbonate Preservative: 0.0047 lbs Another part of the field was selected as the untreated control. Two inches of water was applied to the treated and untreated hay over an 8 hour period of time, to simulate 2 inches of rain falling on the hay. Hay was then allowed to dry in the field, racked within 8 hours of baling and then baled in large ton size bales for storage.

Results:

The hay treated with PDMS showed significantly higher feed value results. No visible mold was detected on the treated bales. Untreated bales showed approximately 10% mold formation. Treated hay had significantly greener look, softer feel, and better smell. See a photograph of the treated hay bale in FIG. 1, and see analysis of the treated hay compared to the untreated hay, in the table below.

| Dry Matter Basis | Untreated | Treated |
|---|---|---|
| Moisture | 21.3% | 17% |
| Crude Protein | 15.7% | 23.1% |
| Acid Detergent Fiber | 41.8% | 30.9% |
| Neutral Detergent Fiber | 49.9% | 37.8% |
| TDN | 54.0% | 65.7% |
| RFV | 105.5 | 159.8 |

Example #2

Mold Control in Lab Trials

Test Objective: To determine the efficacy of a PDMS silicone mix with water on the control of mold on forage crops using chopped hay samples.

Test Procedure: Samples of chopped hay (haylage) were taken from the field and treated with a mix of PDMS and water (sample A-2) and other samples were treated with just water (Sample 11-2). The PDMS liquid was mixed as follows:

PDMS: ½ oz of 30% PDMS (see above definition) added to 15 oz of distilled water and applied using a commercial grade hand spray bottle. Total liquid equals 15 oz equivalent per ton of forage. This equates to 0.5 oz for PDMS per ton of treated forage. (Forage equivalent mass estimated at 15% moisture.)

Results: The PDMS-treated haylage sample showed significantly less mold growth after 6 months than the untreated (water-treated-only) sample. Mold was capable of forming on the outside of the forage sample along the plastic forage interface but was not able to propagate into the forage mass. The untreated sample formed mold on the surface of the sample and throughout the mass of the sample. See the treated sample in FIG. 2A and the treated sample in FIG. 2B. FIG. 2A shows a the treated sample inside an opened plastic bag/wrap; the visible surface of the treated sample has substantially maintained its normal texture and color, with only small amounts of mold (all at the interface between the plastic container and the sample), illustrating little or no mold growing in the interior of the sample. FIG. 2B shows the untreated sample inside an opened plastic bag/wrap; the visible surface of untreated sample is substantially (greater than 90%) covered with mold.

Discovery: PDMS disrupts the propagation of mold preventing mold from growing. PDMS has only marginal ability to control mold growth at the plastic—forage interface. Note that a small amount of mold fondled in the PDMS—plastic interface though the remainder of the forage was untouched by mold. The inventor believes the reason for this is that PDMS is only active if it is not constantly saturated with oxygen or moisture. For example, once hay is baled it is protected from external moisture and oxygen allowing the PDMS to attach itself without constant surface bombardment from oxygen and moisture. In silages, we are typically only able to eliminate the "crust" when it was covered by plastic. PDMS becomes very hydrophobic giving it the ability to suppress mold and heating.

Example #3

Mold Reduction on High Moisture Forages—Baleage

Test Objective: To determine the effect of PDMS on the control of mold and forage deterioration in high moisture forage products.

Figure 1:
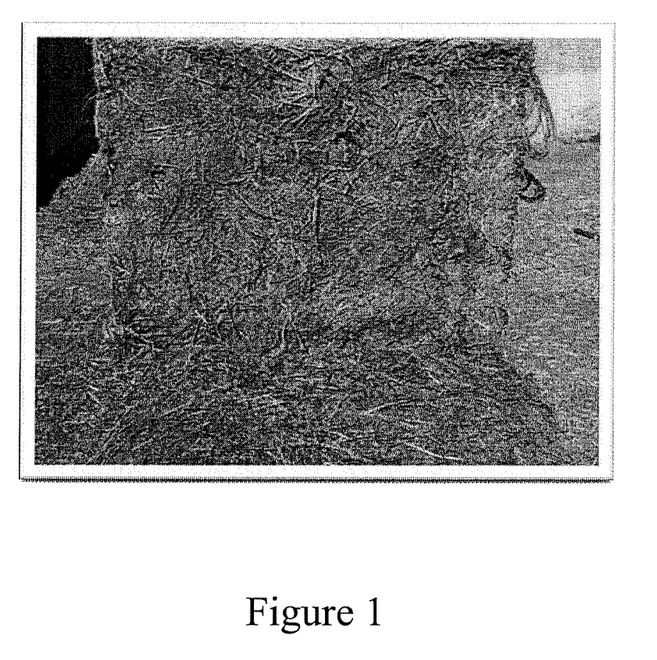
FIG. 1 shows a treated hay bale according to one embodiment of the invention, as described in Example #1 later in this document, wherein Example #1 tested the effects of PDMS on swathed alfalfa hay with and without the application of water.
Figure 2A:
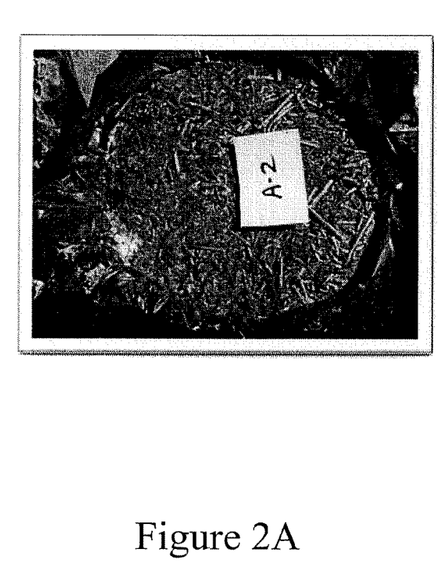
FIGS. 2A and 2B show a treated haylage sample according to an embodiment of the invention, and an untreated haylage sample, respectively, both according to Example #2 later in this document, wherein Example #2 tested efficacy of a PDMS mix with water on the control of mold on forage crops using chopped hay samples.
Figure 2B:
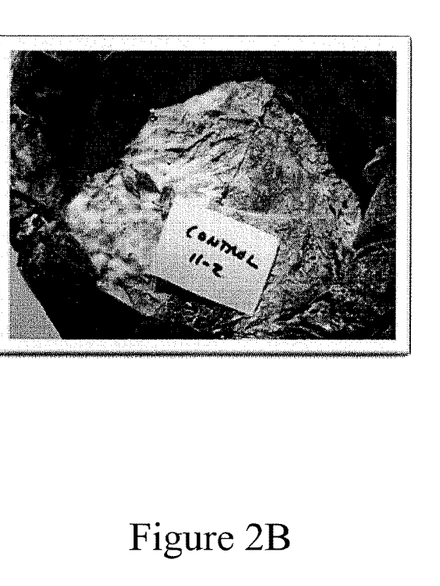
Figure 3A:
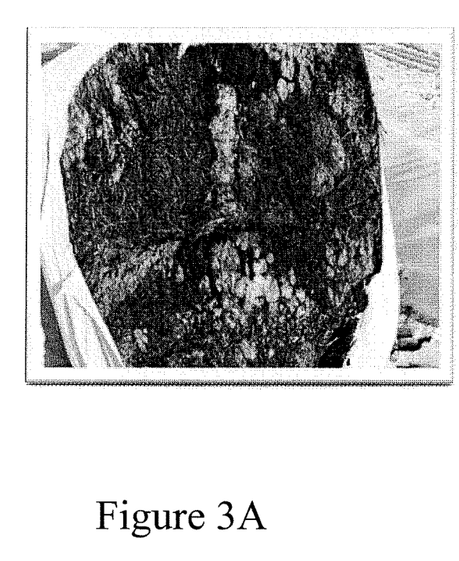
FIGS. 3A and 3B show an untreated sample, and a treated sample according to an embodiment of the invention, respectively, both according to Example #3 later in this document, wherein Example #3 tested the effects of PDMS on the control of mold and forage deterioration in high moisture forage products.
Figure 3B:
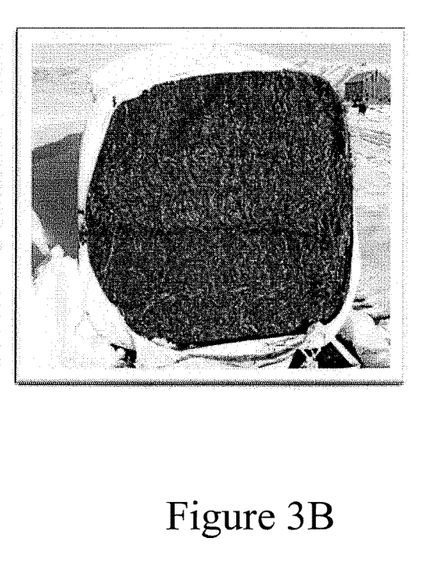

Test Procedure: 6 oz per ton of PDMS solution was applied to the alfalfa forage at the time of baling with the following formula:
PDMS: 2 oz of 30% PDMS (per definition of "30% PDMS" given above)
Lactobacillus Acidophilus Fermentation Carrier: 3.75 oz
Phosphoric Acid Preservative: 0.25 oz
Cobalt Carbonate Preservative: 0.0023 lbs Results: No visible mold or spoilage was found on the treated bale internally or externally. Each bale was tightly wrapped eliminating oxygen and moisture from attacking the surface of the forage in both treated and untreated bales. FIG. 3A portrays the untreated bale, with the plastic wrapping exposed to show a surface of the hay; this surface is mostly covered with mold (greater than 80% covered with mold), resulting in the bale surface having mainly a brown and beige, deteriorated appearance. FIG. 3B portrays the treated bale, with the plastic wrapping exposed to show a surface of the hay; this surface is substantially or entirely normal-appearing in that the hay has good green color and normal cut-hay texture.

Discovery: The PDMS solution, when applied to the forage at the baler, migrates through the bale disrupting the ability of mold to colonize on the outside of the bale as well as internal to the bale.

Example #4

Mold and Heating Control in Baled Alfalfa Hay

Test Objective: To determine the effects of PDMS on baled alfalfa hay with and without the application of PDMS.

Test Procedure: A single field of alfalfa hay was baled from alfalfa presoaked with standing water (est. 4-5 inches). One part of the field was selected for the application of 12 oz of PDMS mix containing for following formula:
PDMS: 4 oz of 30% PDMS (per definition of "30% PDMS" given above)
Lactobacillus Acidophilus Fermentation Carrier: 7.5 oz
Phosphoric Acid Preservative: 0.5 oz
Cobalt Carbonate Preservative: 0.0047 lbs Another part of the field was selected as the untreated control. Hay was then allowed to dry in the field, racked within 8 hours of baling and then baled in large ton size bales for storage.

Figure 4:
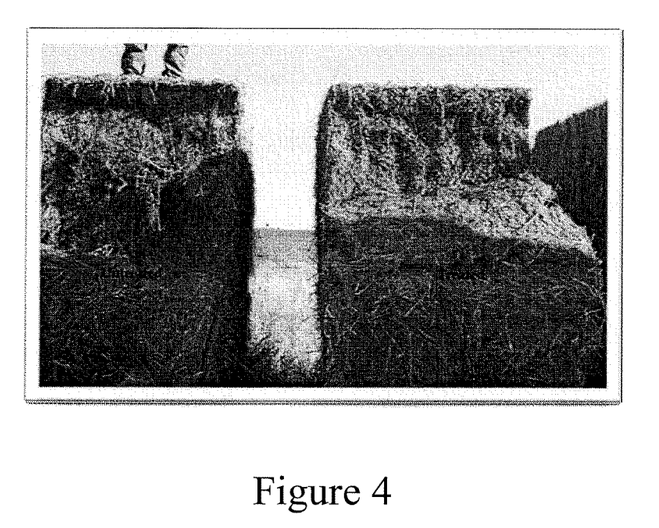
FIG. 4 shows treated and untreated portions of hay, according to an embodiment of the invention, wherein Example #4 tested the effects of PDMS on baled alfalfa hay with and without the application of PDMS.

Results:
The hay treated with PDMS showed significantly higher feed value results. No visible mold was detected on the treated bales. Untreated bales showed over 50% mold formation. Treated hay (at the right of FIG. 4) had significantly greener look and better smell, indicating a higher feed value, compared to the untreated hay (at the left of FIG. 4). Damage was evident in both the untreated and treated bales due to the level of moisture exposure prior to baling.

Example #5

Reduction in Forage Damage Under Optimum Harvesting Conditions

Test Objective: To determine the effects of PDMS on swathed alfalfa hay with and without the application of PDMS wider normal to optimum haying conditions.

Test Procedure: A single field of alfalfa hay was swathed from a field of alfalfa eliminating any adverse effects (e.g. rain, dirt, high moisture at the time of baling) using the following formula:
PDMS: 5 oz of 30% PDMS (per definition of "30% PDMS" given above)
Lactobacillus Acidophilus Fermentation Carrier: 6.5 oz
Phosphoric Acid Preservative: 0.5 oz
Cobalt Carbonate Preservative: 0.0047 lbs Another part of the field was selected as the untreated control. Hay was then allowed to dry in the field, racked within 8 hours of baling and then baled in large ton size bales for storage.

Figure 5A:
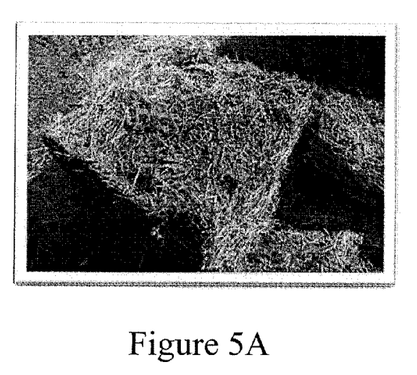
FIGS. 5A and 5B show an untreated sample, and a treated sample according to an embodiment of the invention, respectively, according to Example #5 later in this document, wherein Example #5 tested the effects of PDMS on swathed alfalfa hay with and without the application of PDMS under normal to optimum haying conditions.
Figure 5B:
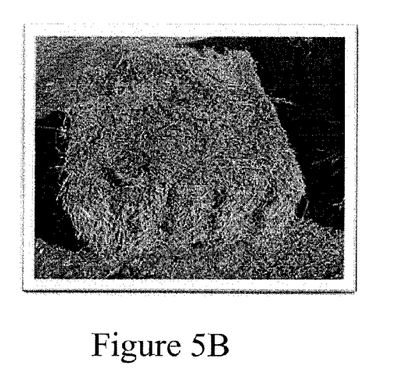

Results:
The hay treated with PDMS showed significantly higher feed value results. No visible mold was detected. Treated hay (FIG. 5B) had significantly greener look and better smell, indicating a higher feed value, compared to the untreated hay (FIG. 5A). Damage was evident in both the untreated and treated bales due to the level of weather exposure prior to baling. See analysis in table below.

| Dry Matter Basis | Untreated | Treated |
| --- | --- | --- |
| Moisture | 11.1% | 14.2% |
| Crude Protein | 18.6% | 20.0% |
| Acid Detergent Fiber | 36.0% | 33.0% |
| Neutral Detergent Fiber | 40.0% | 38.8% |
| TDN | 60.2% | 63.4% |
| RFV | 141.7 | 151.4 |

Example #6

Effect of PDMS on Silage Preservation

Test Objective: To determine the effects of PDMS on silages including grass silages.

Test Procedure: A single field of grass was cut and chopped and treated with the following formula:
PDMS: 1.75 oz of 30% PDMS (per definition above)
Lactobacillus Acidophilus Fermentation Carrier: 4 oz
Phosphoric Acid Preservative: 0.25 oz
Cobalt Carbonate Preservative: 0.0018 lbs An untreated control pit was not prepared. The treated pit was packed and covered with plastic.

Figure 6:
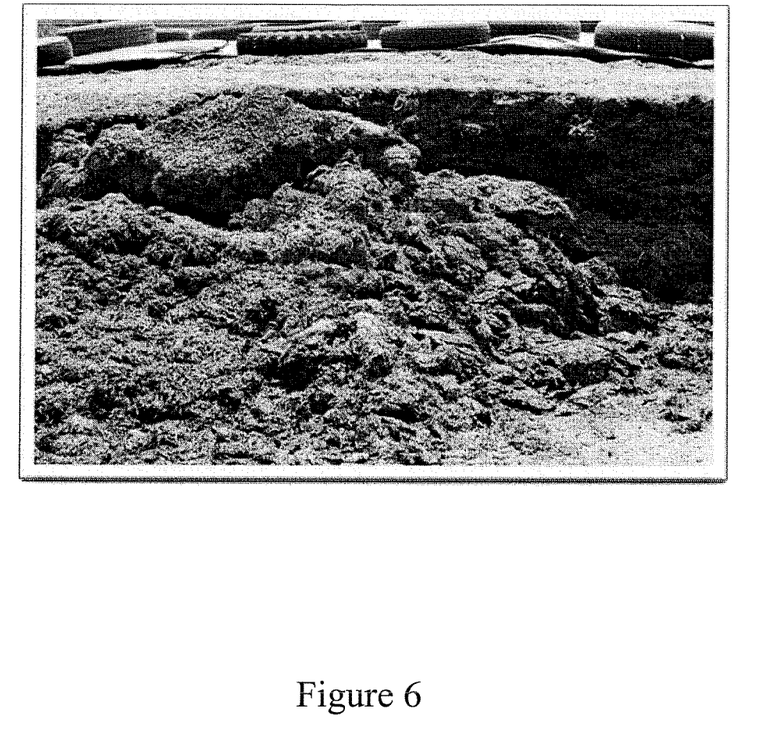
FIG. 6 shows a silage sample according to an embodiment of the invention, as in Example #6 later in this document, wherein Example #6 tested the effects of PDMS on silages including grass silages.

Results:
The silage treated showed no signs of visible spoilage (FIG. 6). No mold was observed. No crust was observed. No runoff was observed. Visual observations were made between 2 and 6 months after storage.

Example #7

Effect of PDMS on Water Repellency

Test Objective: To determine the effects of different concentrations of PDMS on the ability of forages to repel water.

Test Procedure: Samples of freshly cut alfalfa hay was taken and applied with varying concentrations of PDMS through a sprayer to simulate the application of PDMS on field conditions.

The following solutions were prepared:
Sample 1) 0.93 grams of 30% PDMS Solution in 24 ounces of distilled water
Sample 2) 3.75 grams of 30% PDMS Solution in 24 ounces of distilled water
Sample 3) 5.6 grams of 30% PDMS Solution in 24 ounces of distilled water
Sample 4) 9.4 grams of 30% PDMS Solution in 24 ounces of distilled water
Sample 5) 13.1 grams of 30% PDMS Solution in 24 ounces of distilled water
Sample 6) 56.25 grams of 30% PDMS Solution in 24 ounces of distilled water When applied to the surface of the forage, the following concentrations were applied:
Sample 1) Equivalent 5 ppm PDMS per ton of forage.
Sample 2) Equivalent 20 ppm PDMS per ton of forage.
Sample 3) Equivalent 30 ppm PDMS per ton of forage.
Sample 4) Equivalent 50 ppm PDMS per ton of forage.
Sample 5) Equivalent 70 ppm PDMS per ton of forage.
Sample 6) Equivalent 300 ppm PDMS per ton of forage.

The application applied was between 2-3 grams of total solution per sample using a sprayer. Percent absorbency was measured by applying water through the sprayer to the forage surface and then applying mechanical motion (shaking) to the forage. The forage was weighed before the step of spraying of the water onto the forage, and weighed again after the shaking step, so that the weight difference could be determined, which corresponded to the amount of water absorbed on the forage. An untreated control pit was not prepared.
Results:

PDMS Solution - Moisture Repellency Trial

| Sample | Initial Wt | Wet Weight | Final Wt | Difference | Percent Absorbency |
|---|---|---|---|---|---|
| 5 ppm | 55.5 | 59.3 | 58.6 | 0.7 | 82% |
| 20 ppm | 54.3 | 57.2 | 56.3 | 0.9 | 69% |
| 30 ppm | 56.1 | 58.2 | 57.3 | 0.9 | 57% |
| 50 ppm | 55.1 | 57.5 | 56.1 | 1.4 | 42% |
| 70 ppm | 56.8 | 59.6 | 57.7 | 1.9 | 32% |
| 300 ppm | 54.8 | 57.3 | 55.5 | 1.8 | 28% |

The results of this tray are shown in the above table, wherein percent absorbency of water is highest at the lowest ppm of PDMS and increases with increased ppm PDMS. Water repellency may be related to percent absorbency in this test, by the relationship of 100%−Percent Absorbency=Percent Water Repellency. Therefore, within the range of 5-300 ppm, the data shows an increase in water repellency with increased concentration of PDMS per sample, that is, increased water repellency with increased amounts of PDMS applied to a given amount of forage.

Some embodiments of the invention include application of a treatment composition that comprises ranging from about 5-40000 ppm PDMS on forage, dry mater basis. The preferred application in this range of PDMS on forage occurs as early as 5 days before cutting and as late as 14 days after cutting, more preferably within a period extending from 3 days before to 7 days after cutting of the forage, and even more preferably within 1 day or less before or after cutting of the forage. Most preferably, the application is done within one hour before or after the cutting. The more preferred ppm of PDMS applied to forage is 18-300 ppm PDMS (dry matter basis), and more preferably in amounts ranging from 20-70 ppm PDMS on the forage (dry matter basis), and most preferably 30-50 ppm PDMS on the forage (dry matter basis). The treatment composition may include various components, in addition to the PDMS, including water or other carrier liquids, emulsifiers, preservatives, fermentation products, or other components for keeping the silicone suspended/mixed in the treatment composition, but the inventor considers the broad scope of the invention to include PDMS in any liquid that is sprayed on the forage within a short time of the cutting of the forage, preferably within the time range explained above in this paragraph and preferably in the ppm PDMS range explained above. The preferred embodiments are not compositions for pest control (pesticide) or weed control (herbicide), and therefore do not comprise chemical that are conventionally known as pesticides and weed herbicides. The preferred embodiments are not compositions for anti-foaming processes/results during fermentation of silage or other feeds. The invention may comprise feed or forage products that have been treated/coated with embodiments of the treatment composition. Although this invention has been described above with reference to particular means, materials and embodiments, it is to be understood that the invention is not limited to these disclosed particulars, but extends instead to all equivalents within the broad scope of the following claims.

The invention claimed is:

1. A method of suppressing mold, heating, and spoilage in harvested forage products, the method comprising: cutting forage from plants growing in an agricultural field; and after said cutting of the forage, coating the forage with a layer of treatment spray comprising a mold-suppression active ingredient that is polydimethylsiloxane (PDMS) of the formula R3-SiO[Si(CH3)20]nSi-R3 where R is any organic or inorganic functional group and n is any number, of 2 or more, of repeating monomer units, where said treatment spray consisting essentially of: polydimethylsiloxane (PDMS), water, silicone dioxide, a liquid fermentation product of lactobacillus acidophilus bacteria, cobalt carbonate, and phosphoric acid and wherein said treatment spray is coated on the forage in an amount equal to 18-300 weight-ppm PDMS on said forage, dry matter basis.

2. The method of claim 1, wherein said coating of the forage is done up to 14 days after said cutting.

3. The method of claim 1, wherein said treatment spray does not comprise any pesticide and does not include any herbicide.

4. The method of claim 1, wherein said treatment spray is dispensed from at least one sprayer nozzle installed on agricultural equipment selected from the group consisting of a baler, and a vehicle connected to a baler.

5. The method of claim 1, wherein said forage is selected from the group consisting of alfalfa hay, alfalfa silage, grass hay, grass silage, grain hay, grain silage, cereal grain hay, barley hay, wheat hay, oat hay, rye hay, and triticale hay, barley silage, wheat silage, oat silage, rye silage, triticale silage, corn silage, corn, rolled corn, flaked corn, cracked corn, and processed corn.

6. The method of claim 1, wherein said forage is selected from the group consisting of alfalfa hay, alfalfa silage, grass hay, grass silage, grain hay, grain silage, cereal grain hay, barley hay, wheat hay, oat hay, rye hay, and triticale hay, barley silage, wheat silage, oat silage, rye silage, triticale silage, corn silage, corn, rolled corn, flaked corn, cracked corn, and processed corn, and wherein said treatment spray is dispensed from at least one sprayer nozzle installed on agricultural equipment selected from the group consisting of a baler, and a vehicle connected to a baler.

7. A method of suppressing mold, heating, and spoilage in harvested forage products for animals, the method comprising: cutting forage from plants growing in an agricultural field; and after cutting the forage, coating said forage with a layer of mold-suppression spray, the mold-suppression spray comprising: polydimethylsiloxane (PDMS) of the formula R3-SiO[Si(CH3)20]nSi-R3 where R is any organic or inorganic functional group and n is any number, of 2 or more, of repeating monomer units; water; silicone dioxide; a liquid fermentation product of lactobacillus acidophilus bacteria; cobalt carbonate; and phosphoric acid; wherein the PDMS is in the range of 8.3-16.7 liquid-volume percent of the mold-suppression spray; and said coating is performed up to 14 days after said cutting.

8. The method of claim 7, wherein said forage is selected from the group
consisting of alfalfa hay, alfalfa silage, grass hay, grass silage, grain hay, grain silage, cereal grain hay, barley hay, wheat hay, oat hay, rye hay, and triticale hay, barley silage, wheat silage, oat silage, rye silage, triticale silage, corn silage, corn, rolled corn, flaked corn, cracked corn, and processed corn, and wherein said mold-suppression spray is dispensed from at least one sprayer nozzle installed on agricultural equipment selected from the group consisting of a baler, and a vehicle connected to a baler.

9. A method of suppressing mold, heating, and spoilage in forage products for animals, the method comprising: cutting forage from plants growing in an agricultural field; and after cutting the forage and at the time of baling the forage, coating said forage with a layer of mold-suppression spray, the mold-suppression spray comprising: polydimethylsiloxane (PDMS), water, and silicone dioxide, the PDMS being of the formula R3-SiO[Si(CH3)20]nSi-R3 where R is any organic or inorganic functional group and n is any number, of 2 or more, of repeating monomer units; a liquid fermentation product (LFP) of lactobacillus acidophilus bacteria; cobalt carbonate; and phosphoric acid; wherein the PDMS-solution is about 42 LV % of the spray, the LFP is about 54 LV % of the spray, and the cobalt carbonate and phosphoric acid are about 4 LV % of the spray;
the method further comprising storing the coated forage and then feeding the coated forage to an animal.

10. The method of claim 9, wherein the spraying is performed within one minute of baling.

11. The method of claim 9, wherein said forage is selected from the group consisting of alfalfa hay, alfalfa silage, grass hay, grass silage, grain hay, grain silage, cereal grain hay, barley hay, wheat hay, oat hay, rye hay, and triticale hay, barley silage, wheat silage, oat silage, rye silage, triticale silage, corn silage, corn, rolled corn, flaked corn, cracked corn, and processed corn, and wherein said mold-suppression spray is dispensed from at least one sprayer nozzle installed on agricultural equipment selected from the group consisting of a baler, and a vehicle connected to a baler.

12. A mold-suppression spray, for application to animal-feed forage after the forage is cut from plants in an agricultural field, the spray consisting essentially of: polydimethylsiloxane (PDMS), water, silicone dioxide, and a mold-suppression active ingredient that is polydimethylsiloxane (PDMS), the PDMS being of the formula R3-SiO[Si(CH3)20]nSi-R3 where R is any organic or inorganic functional group and n is any number, of 2 or more, of repeating monomer units; a liquid fermentation product (LFP) of lactobacillus acidophilus bacteria; cobalt carbonate; and phosphoric acid; wherein said PDMS is in the range of 8.3-16.7 liquid-volume percent of the mold-suppression spray.

* * * * *